United States Patent
Zanetti et al.

(10) Patent No.: US 8,489,308 B2
(45) Date of Patent: Jul. 16, 2013

(54) METHOD FOR ESTIMATING OXYGEN CONCENTRATION DOWNSTREAM A DIESEL OXIDATION CATALYST

(75) Inventors: Igor Zanetti, Verrayes (IT); Simone Barbero, Turin (IT); Stefano Cassani, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 529 days.

(21) Appl. No.: 12/858,284

(22) Filed: Aug. 17, 2010

(65) Prior Publication Data

US 2011/0041476 A1    Feb. 24, 2011

(30) Foreign Application Priority Data

Aug. 19, 2009  (GB) .................................. 0914495.7

(51) Int. Cl.
| | |
|---|---|
| *G06F 19/00* | (2011.01) |
| *F02D 41/14* | (2006.01) |
| *F01N 11/00* | (2006.01) |
| *F01N 3/20* | (2006.01) |
| *F01N 3/035* | (2006.01) |

(52) U.S. Cl.
USPC ............. 701/103; 701/104; 701/105; 60/285; 60/286; 60/299; 60/311; 702/182; 73/114.75

(58) Field of Classification Search
USPC ................. 123/299, 300, 399, 403, 672, 679, 123/683; 701/101–105, 108–110, 114, 115; 60/274, 276, 277, 285, 286, 295, 299, 301, 60/311; 73/114.06, 114.71, 114.75; 702/182, 702/183
See application file for complete search history.

(56) References Cited

U.S. PATENT DOCUMENTS

| | | | | |
|---|---|---|---|---|
| 4,356,065 | A * | 10/1982 | Dietz ............................. | 204/429 |
| 5,363,832 | A * | 11/1994 | Suzumura et al. ............ | 123/478 |
| 6,857,263 | B2 * | 2/2005 | Gray et al. ...................... | 60/285 |
| 7,200,990 | B2 * | 4/2007 | Gabrielsson et al. ........... | 60/286 |
| 7,769,500 | B2 * | 8/2010 | Kuentzle ....................... | 701/115 |
| 8,191,516 | B2 * | 6/2012 | Moon et al. .................... | 123/64 |
| 2005/0188681 | A1 | 9/2005 | Emi et al. | |
| 2012/0031384 | A1 * | 2/2012 | Haskara et al. ............... | 123/703 |

FOREIGN PATENT DOCUMENTS

| | | | | |
|---|---|---|---|---|
| DE | 10333337 | A1 | 2/2005 | |
| DE | 60103346 | T2 | 4/2005 | |
| DE | 60112672 | T2 | 6/2006 | |
| DE | 102006018594 | A1 | 2/2007 | |
| DE | 102005041662 | A1 | 3/2007 | |
| DE | 102010046491 | A1 * | 3/2012 | .................. 701/103 |
| JP | 5044433 | A | 2/1993 | |
| JP | 8326578 | A | 12/1996 | |

* cited by examiner

*Primary Examiner* — Willis R Wolfe, Jr.
(74) *Attorney, Agent, or Firm* — Ingrassia Fisher & Lorenz, P.C.

(57) ABSTRACT

A method and a control system are provided for estimating oxygen concentration downstream a diesel oxidation catalyst within a diesel engine system. The method includes, but is not limited to at least an intake manifold, a combustion chamber, an exhaust manifold, and the diesel oxidation catalyst located in the exhaust line upstream a diesel particulate filter, the method comprising: determining unburned fuel mass flow ejected from the combustion chamber, determining air mass fraction in the exhaust manifold, estimating air mass fraction downstream the diesel oxidation catalyst as a function of said unburned fuel mass flow and said air mass fraction in the exhaust manifold, estimating oxygen concentration downstream the diesel oxidation catalyst as a function of the estimated air mass fraction downstream the diesel oxidation catalyst.

15 Claims, 5 Drawing Sheets

METHOD FOR ESTIMATING OXYGEN CONCENTRATION DOWNSTREAM A DIESEL OXIDATION CATALYST

CROSS-REFERENCE TO RELATED APPLICATION

This application claims priority to British Patent Application No. 0914495.7, filed Aug. 19, 2009, which is incorporated herein by reference in its entirety.

TECHNICAL FIELD

The present invention relates to estimation of oxygen concentration downstream a diesel oxidation catalyst (DOC) within a diesel engine system.

BACKGROUND

A diesel engine system generally comprises an intake manifold, at least one combustion chamber, an exhaust manifold, and an exhaust line provided with a diesel oxidation catalyst (DOC).

The diesel oxidation catalyst is conventionally provided for degrading residual hydrocarbons and carbon oxides, which are formed in the combustion process of the engine and are contained in the exhaust gas flow.

In order to accomplish tighter emission legislation, most of the diesel engine systems are also equipped with a diesel particulate filter (DPF), which is located in the exhaust line downstream the DOC for capturing and removing diesel particulate matter (soot) from the exhaust gas flow.

The diesel particulate filters generally comprise a casing which contains a filter body of porous material, with dead-end holes extending into the filter body from opposite sides thereof. In normal operation, exhaust gas enters the dead-end holes from one side of the filter body, and passes through the filter material into the dead-end holes of the other side, whereby the particulate matter carried by the exhaust gas is retained at the surface and in the pores of the filter body.

The accumulating particulate matter increases the pressure drop across the filter. When the pressure drop becomes excessive, it may cause the filter body to crack, rendering the filter ineffective, or it may affect the efficiency of the diesel engine.

In order to avoid excessive clogging of the filter, the particulate matter must be removed when critical amount of it has accumulated in the filter body.

This process is generally referred to as regeneration of the diesel particulate filter. Conventionally, regeneration is achieved by heating the DPF to a temperature at which the accumulated particulate matter burns off, leaving the filter body clean again.

The heating of the filter is provided by means of a temperature increase of the exhaust gases entering the DPF. This temperature increase (typically up to 630° C.) has to be kept for a certain time (typically 600 seconds) in all possible driving condition (i.e. city driving, highway driving, etc.).

Exhaust gas temperature increase is obtained with a dedicated multi-injection pattern, by means of which an amount of fuel is injected into the combustion chamber after the piston has passed its top dead center position, and the fuel that was injected before is already burnt.

Such late-injected fuel can get a first temperature increase due to fuel combustion inside combustion chamber, and a second temperature increase due to fuel oxidation inside the catalyst (DOC) of the exhaust line. More particularly, the first temperature increase is achieved by a single injection of fuel which is generally referred to as after-injection. The after injection starts before the exhaust valves opening, and sufficiently near to TDC for the fuel to burn quite completely into the combustion chamber. The combustion of after-injected fuel produces hot gases which are subsequently discharged from the combustion chamber and channeled by the exhaust line to pass through the DPF, whereby the latter is heated.

The second temperature increase is achieved by one or more injections of fuel which are generally referred to as post-injections. Post-injections start sufficiently far from TDC for the fuel to not burn into the combustion chamber, typically after the exhaust valves opening. Therefore, the post-injected fuel is ejected unborn from the combustion chamber and is channeled by the exhaust line towards the diesel oxidation catalyst (DOC).

When the particulate matter load in the DPF is high, after the appropriate regeneration temperature is reached, the burning of every single particle generates further heat, which is quite efficiently transferred to a nearby particle, causing it to burn too. When the concentration of particles in the DPF decreases, this type of heat transfer tends to become less effective. It implies that at the beginning of the regeneration process the temperature inside the DPF increases rapidly. If the combustion of the particulate matter is not controlled, said temperature increase can be faster and higher than necessary and, under certain circumstances, can also damage the diesel particulate filter.

The amount of oxygen in the exhaust gases downstream the DOC affects the combustion of particles inside the DPF, and therefore it is a key parameter in controlling temperature gradients inside the DPF during regeneration process. However, no control systems are actually available for measuring and controlling the oxygen concentration downstream the diesel oxidation catalyst, probably because the control systems which rely upon oxygen sensing technology have many drawbacks.

As a matter of fact, said control systems are generally satisfactory for managing steady state or slowly varying oxygen levels, but are not satisfactory for managing quickly varying oxygen levels which can be found at some points within the diesel engine system. Moreover, known wide range oxygen sensing technology are affected by the temperature and pressure conditions, so that they often require proper compensation to produce accurate oxygen concentration information. Besides, oxygen sensors measurement is not accurate when the sensor is waking with a high hydrocarbons concentration in the exhaust gas flow, which is the case of DPF regeneration conditions.

At least one aim of the present invention is to estimate the oxygen concentration downstream a Diesel Oxidation Catalyst (DOC) within diesel engine systems. Another aim of the present invention is to meet the goal with a rather simple, rational and inexpensive solution. In addition, other aims, desirable features, and characteristics will become apparent from the subsequent summary and detailed description, and the appended claims, taken in conjunction with the accompanying drawings and this background.

SUMMARY

The embodiments of the invention provides a method for estimating oxygen concentration downstream the diesel oxidation catalyst within a diesel engine system, which is effective even during regeneration process of the DPF. The diesel engine system generally comprises at least an intake manifold, a combustion chamber, an exhaust manifold, and a diesel oxidation catalyst (DOC) which is located in an exhaust line upstream a diesel particulate filter (DPF).

An embodiment of the method comprises determining unburned fuel mass flow ejected from the combustion chamber, determining air mass fraction in the exhaust manifold, estimating air mass fraction downstream the diesel oxidation catalyst as a function of such unburned fuel mass flow and such air mass fraction in the exhaust manifold, estimating oxygen concentration downstream the diesel oxidation catalyst as a function of the estimated air mass fraction downstream the diesel oxidation catalyst.

The unburned fuel mass flow comprises post-injected fuel mass flow, which is injected into the combustion chamber during Diesel Particulate Filter regeneration process. The unburned fuel mass flow comprises also the part of after-injected fuel mass flow, which is injected into the combustion chamber during diesel particulate filter regeneration process, but which does not burn in the combustion chamber.

Preferably, two empirically determined data sets, correlating post-injected fuel mass flow and unburned part of after-injected fuel mass flow to a plurality of engine operating parameters, are used to determine the total unburned fuel mass flow.

Estimating air mass fraction downstream the diesel oxidation catalyst comprises estimating hydrocarbons mass flow converted in the diesel oxidation catalyst by oxidation process of said unburned fuel mass flow therein, preferably by means of determining diesel oxidation catalyst efficiency, determining air to fuel stoichiometric ratio, and estimating said hydrocarbons mass flow converted in the diesel oxidation catalyst as a function of unburned fuel mass flow, diesel oxidation catalyst efficiency, and fuel stoichiometric ratio. Preferably, two empirically determined data sets, correlating Diesel Oxidation Catalyst efficiency and air to fuel stoichiometric ratio to a plurality of engine operating parameters, are used to estimate the hydrocarbon mass flow.

The embodiments of the invention further provide a control system for a diesel combustion engine. The control system comprises: means for providing respective measures of a plurality of engine operating parameters, a microprocessor based controller for applying said engine operating parameter measures to a computer code for carrying out the above mentioned method for estimating oxygen concentration downstream the diesel oxidation catalyst, and at least one actuator controlled in response to said estimated oxygen concentration downstream the Diesel Oxidation Catalyst. Preferably, said at least one actuator comprises an actuator for regulating an engine operating parameter which affects oxygen concentration downstream the Diesel Oxidation Catalyst, so that the control system is able to control the combustion of soot in the DPF during regeneration process.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
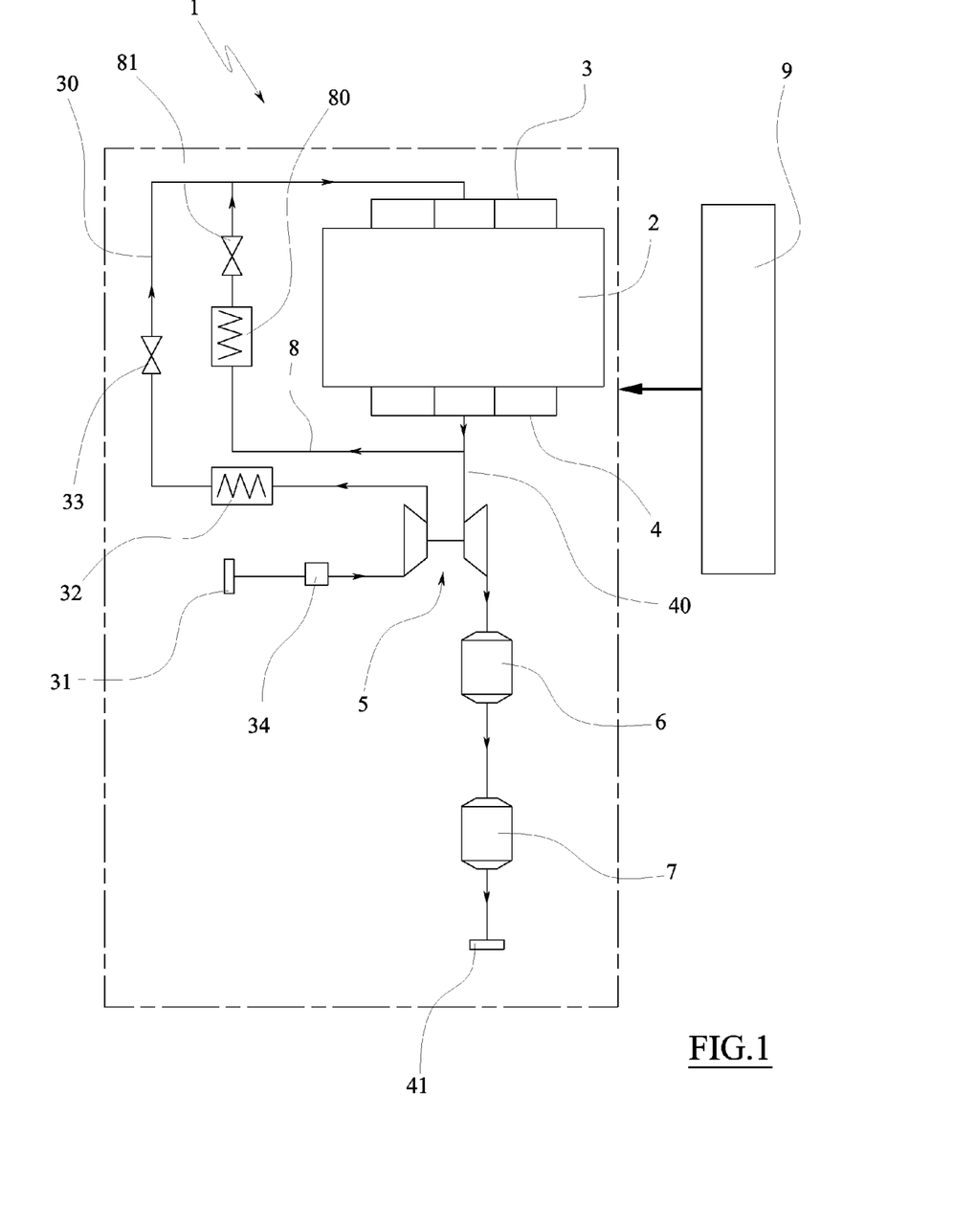
FIG. 1 is a schematic illustration of a diesel engine system and engine controller in accordance with one embodiment of the present invention.

A preferred embodiment of the present invention is applied to a turbocharged diesel engine system, which is generally labeled 1 in FIG. 1.

The diesel engine system 1 comprises engine 2 having intake manifold 3 and exhaust manifold 4, each of which comprises a plurality of runners corresponding in number to the number of individual cylinder of the engine 2. Intake manifold 3 is located at the end of an intake line 30, while the exhaust manifold 4 is located at the beginning of an exhaust line 40. Intake line 30 comprises an inlet 31 for aspirating air at substantially atmospheric pressure. Downstream the inlet 31, a well known turbocharger 5 is located in the intake line 30, for compressing the airflow and for providing it to an intercooler 32. Further downstream, the intake line 30 comprises an intake throttle valve 33 which is electrically controllable for varying the intake restriction.

The exhaust gases are expelled from individual cylinders of the engine 2 to the corresponding plurality of runners and into the exhaust manifold 4. Exhaust line 40 channels the exhaust gases firm the exhaust manifold 4 to drive the turbine of turbocharger 5 and thereafter to atmosphere through an outlet 41.

Between turbocharger 5 and exhaust port 41, the exhaust line 40 comprises a diesel oxidation catalyst 6 (DOC) provided for degrading residual hydrocarbons and carbon oxides which are produced by the fuel combustion inside the engine 2, and which are contained in the exhaust gas flow. Downstream the Diesel oxidation catalyst 6, a diesel particulate filter 7 (DPF) is located in the exhaust line 40 for capturing and removing diesel particulate matter (soot) from the exhaust gas flow, before it reaches the exhaust port 41.

Between exhaust manifold 4 and turbocharger 5, there is an exhaust gas recirculation line 8, by means of which a portion of exhaust gas flow is directed to the intake line 30 downstream the throttle valve 33, where it is mixed with the flesh intake airflow to establish the ingested cylinder charge gas mix. The recirculation line 8 is provided with a conventional gas cooler 80 and with an exhaust gas recirculation valve 81 (EGR), which is electrically controllable for varying the opening area of the valve, and so the portion of exhaust gas flow directed to the intake line 30.

Integral to the diesel engine system 1 is a control system, which comprises sensing means for providing respective measures of a plurality of engine operating parameters, and a microprocessor based controller 9 (ECM), including a computer code for applying the engine operating parameter measures to engine control routines.

Figure 2:
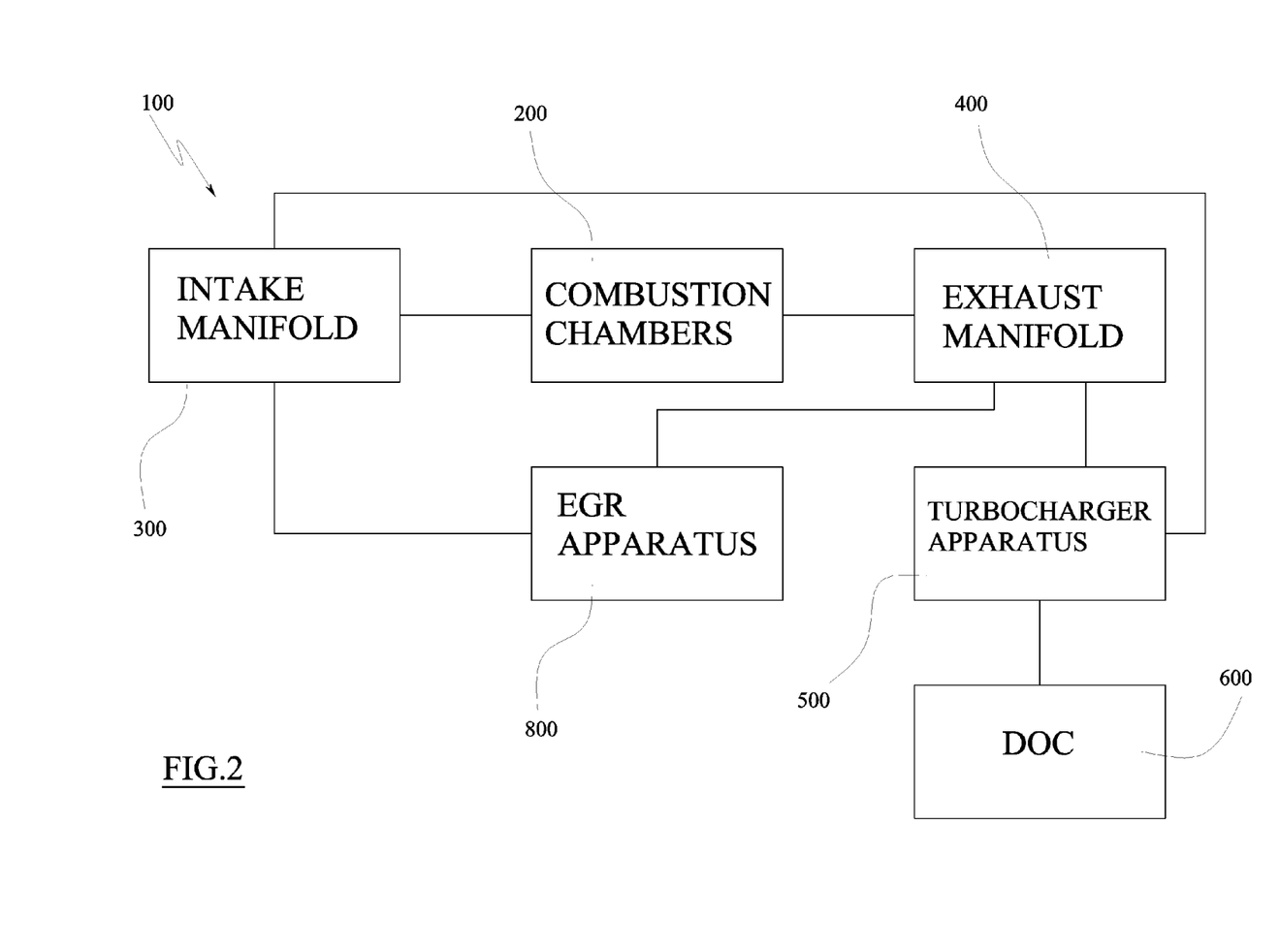
FIG. 2 is a schematic illustration of a model wherein the diesel engine system is reticulated into engine sub-systems.

According to the method of the present invention, the diesel engine system 1 is reticulated into interconnected sub-systems, establishing the system model 100 shown in FIG. 2. System model 100 comprises sub-system models of the intake manifold 300, combustion chambers 200, exhaust manifold 400, exhaust gas recirculation apparatus 800, turbocharger apparatus 500, and diesel oxidation catalyst 600. Interconnections between the various sub-system models are shown by solid lines and correspond to various model interactions and interdependencies of model parameters related to sub-system mass flows.

The specific sub-system models corresponding to the reticulated engine system are individually presented in the various FIG. 3A through FIG. 3F. For every single sub-system models, the corresponding figure illustrates along the left side of the model block a plurality of model inputs, and along the top side of the model block a plurality of model outputs. The model outputs provide inputs to other of the sub-system models as will become apparent with additional description and reference to additional figures. Where no specific provisions are provided for, the parameters, constants and other quantities used by the models are to be considered stored in or determined by the ECM in accordance with the engine control routines.

Figure 3A:
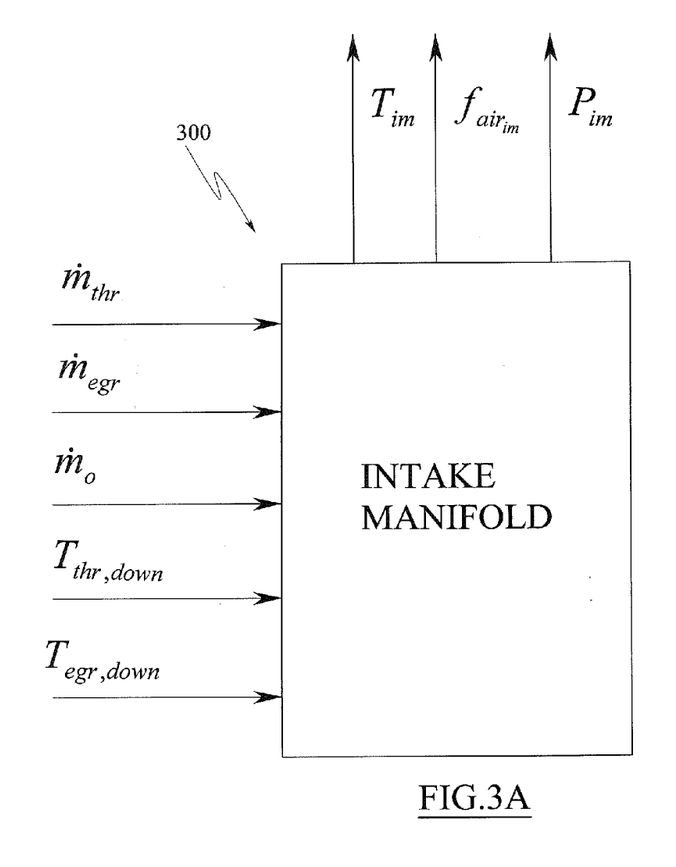
FIG. 3A to FIG. 3F are schematic illustrations respectively of intake manifold sub-system model, combustion chamber sub-system model, exhaust manifold sub-system model, EGR apparatus sub-system model, turbocharger apparatus sub-system model, and diesel oxidation catalyst sub-system model.

The intake manifold model 300 is illustrated in FIG. 3A. The significant model inputs are identified as the mass flows into the intake manifold comprising the EGR flow $\dot{m}_{egr}$ and the fresh air intake $\dot{m}_{thr}$, and the mass flow $\dot{m}_o$ from the intake manifold into the combustion chamber. In the present example, the fresh air intake $\dot{m}_{thr}$ is the turbocharger boosted compressor mass flow. The following algebraic and differential modeling equations describe the intake manifold:

$$\frac{dm_{im}}{dt} = \dot{m}_{thr} + \dot{m}_{egr}(P_{im}) - \dot{m}_o(P_{im}, T_{im}) \quad (1)$$

$$\frac{dP_{im}}{dt} = \frac{R_{im}}{c_{v_{im}} V_{im}} \left[ \begin{array}{c} \dot{m}_{thr} T_{thr,down} c_{P_{thr,down}} + \dot{m}_{egr}(P_{im}) T_{egr,down} c_{P_{egr,down}} - \\ \dot{m}_o(P_{im}, T_{im}) T_{im} c_{P_{im}} \end{array} \right] \quad (2)$$

$$T_{im} = \frac{P_{im} V_{im}}{R_{im} m_{im}} \quad (3)$$

where:
$m_{im}$=mass estimation in intake manifold,
$\dot{m}_{thr}$=air flow through throttle valve,
$\dot{m}_{egr}$=mass flow through EGR valve,
$\dot{m}_o$=mass flow into the combustion chambers,
$P_{im}$=estimated pressure in intake manifold,
$R_{im}$=gas constant in intake manifold,
$c_{v_{im}}$=constant volume specific heat in intake manifold,
$V_{im}$=intake manifold volume,
$T_{thr,down}$=temperature downstream throttle valve,
$T_{egr,down}$=temperature downstream EGR valve,
$c_{P_{egr,down}}$=constant pressure specific heat at EGR valve,
$T_{im}$=estimated temperature in intake manifold,
$c_{P_{im}}$=constant pressure specific heat in intake manifold, and
$c_{P_{thr,down}}$=constant pressure specific heat at throttle valve.

Equation describes the mass conservation in the intake manifold, equation (2) describes the energy conservation in the intake manifold, and equation describes ideal gas low.

It is presently assumed that throttle valve dynamics are limited and hence approximate static conditions. Therefore, the throttle mass flow $\dot{m}_{thr}$ is obtained in the present embodiment from a conventional mass airflow sensor (MAF) 34, which is located in the intake line 30 between intake port 31 and turbocharger 5, and which is connected with the ECM. The same throttle valve dynamics assumption allows for setting the throttle downstream flow temperature $T_{thr,down}$ to the intercooler outlet temperature, which can be determined by the ECM as a function of a plurality of operating parameters of the intercooler 32.

In the present embodiment, the quantities $\dot{m}_{egr}$ and $T_{egr,down}$, which represent the air mass flow in the EGR and the temperature downstream EGR valve, are provided by the EGR apparatus model 800. The quantity $\dot{m}_o$, which represents the mass flow into the cylinder, is provided by the combustion chamber model 200.

The intake manifold is more particularly described in accordance with air mass fractions as described in the following algebraic and differential modeling equations:

$$\frac{dm_{im_{air}}}{dt} = \dot{m}_{thr} + f_{air_{em}} \cdot \dot{m}_{egr}(P_{im}) - f_{air_{im}} \dot{m}_o(P_{im}, T_{im}) \quad (4)$$

$$f_{air_{im}} = \frac{m_{im_{air}}}{m_{im}} \quad (5)$$

where:
$m_{im_{air}}$=air mass estimation in intake manifold,
$f_{air_{im}}$=air fraction estimation in intake manifold, and
$f_{air_{em}}$=air fraction estimation in exhaust manifold.

Equation describes air mass conservation in intake manifold, and equation (5) describes the fraction of air estimated in intake manifold.

Figure 3B:
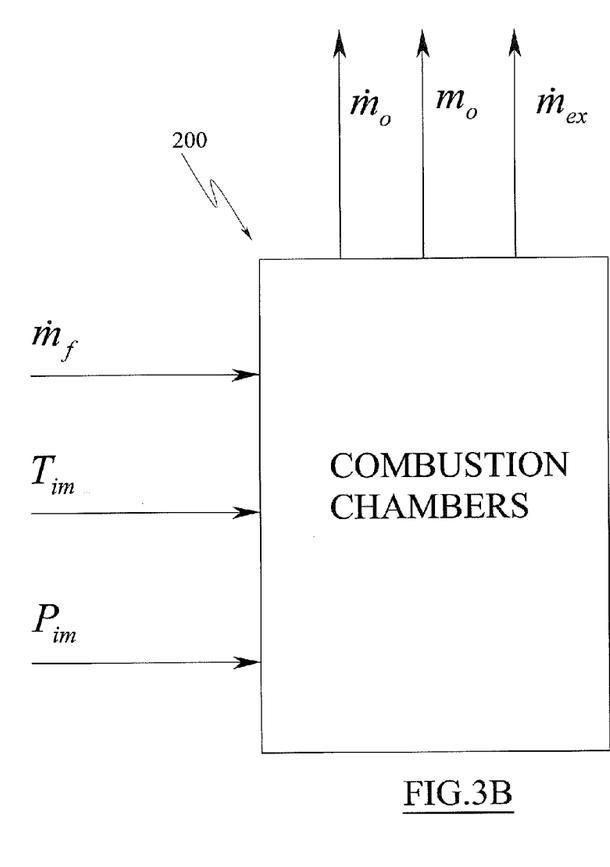

The quantity $f_{air_{em}}$, which represents the air fraction estimation in exhaust manifold, is provided by the combustion chamber model 200. The combustion chamber model 200 is illustrated in FIG. 3B. The combustion chambers are pumping apparatus for effecting mass flow by way of the combustion produced therein. A significant model input is identified as the injected fuel mass flow $\dot{m}_f$. Combustion chamber model 200 utilizes also thermal input associated with the intake manifold, pressures associated with the intake and exhaust manifolds and combustion timing in describing the intake and exhaust port mass flows.

The following modeling equations describe the combustion chambers:

$$m_o = \frac{P_{im}}{R_{im} \cdot T_{im}} \eta_{vol} \frac{V_{eng}}{N_{cyl}} \quad (6)$$

$$\dot{m}_o = m_o \cdot \frac{N_{eng}}{120/N_{cyl}} \quad (7)$$

$$\dot{m}_{ex} = (\dot{m}_o - \dot{m}_f) \cdot (t - \tau_{comb}) \quad (8)$$

where:
$m_o$=mass through inlet valves into the cylinder,
$\eta_{vol}$=volumetric efficiency of the cylinder,
$P_{im}$=estimated pressure in intake manifold,
$T_{im}$=estimated temperature in intake manifold,
$V_{eng}$=engine displacement,
$N_{cyl}$=number of cylinders,
$N_{eng}$=engine speed in rpm,
$\dot{m}_{ex}$=exhaust mass flow from the combustion chambers,
$\dot{m}_f$=injected fuel mass flow into combustion chambers,
t=time, and
$\tau_{comb}$=is the combustion cycle delay.

The fuel flow rate $\dot{m}_f$ is provided by the ECM in accordance with engine control routines. The volumetric efficiency $\eta_{vol}$ is determined by the ECM using an empirically determined data set or map which correlates volumetric efficiency to a plurality of engine operating parameters.

Figure 3C:
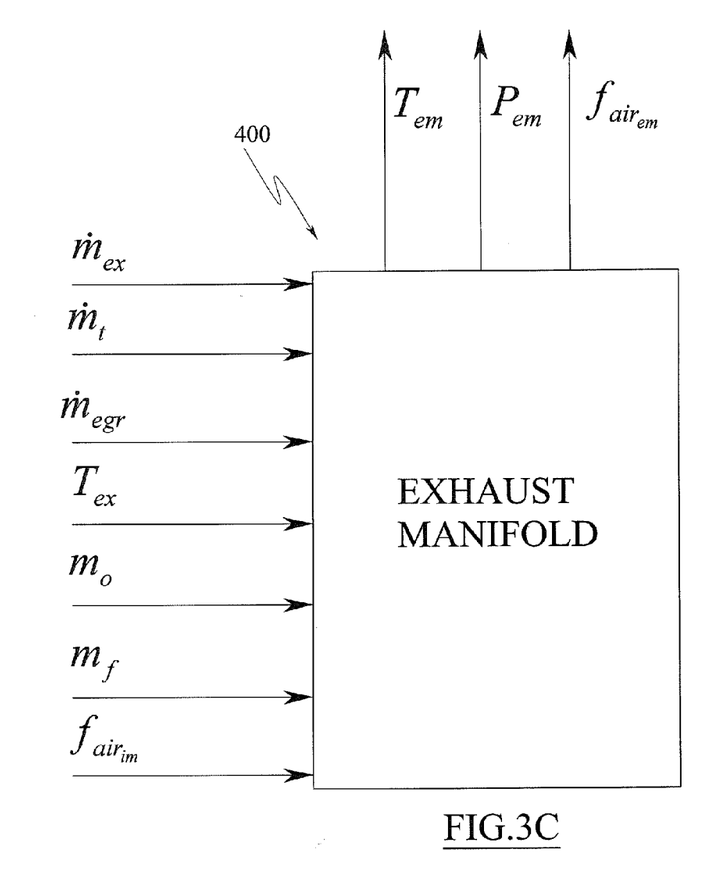

It is noted that the modeling equation for exhaust mass flow $\dot{m}_{ex}$ additionally accounts for combustion transport or cycle delay, represented in the model equation (8) by the temporal term $(t-\tau_{comb})$ which is provided by ECM. The exhaust manifold model 400 is illustrated in FIG. 3C. The significant mass flows are identified as those into the exhaust manifold from the combustion chamber $\dot{m}_{ex}$, and those out of the exhaust manifold comprising the EGR flow $\dot{m}_{egr}$ and the remainder exhausted to atmosphere. In the present example, the reminder exhausted to atmosphere is the turbocharger turbine mass flow $\dot{m}_t$ used to drive the turbocharger. The model utilizes also thermal inputs in describing the temperature and pressure associated with the exhaust manifold gas mass.

The following algebraic and differential modeling equations describe the exhaust manifold:

$$\frac{dm_{em}}{dt} = \dot{m}_{ex} - \dot{m}_{egr} - \dot{m}_t \tag{9}$$

$$\frac{dP_{em}}{dt} = \frac{R_{em}}{c_{v_{em}}V_{em}}\left[\dot{m}_{ex}T_{ex}c_{p_{ex}} - (\dot{m}_{egr}+\dot{m}_t)T_{em}c_{p_{em}} - \dot{Q}_{em}\right] \tag{10}$$

$$\dot{Q}_{em} = h_{tem}A_{em}(T_{em}-T_{amb}) \tag{11}$$

$$T_{em} = \frac{P_{em}V_{em}}{R_{em}m_{em}} \tag{12}$$

where:
$m_{em}$=mass estimation in the exhaust manifold,
$\dot{m}_t$=turbocharger turbine mass flow,
$\dot{m}_{egr}$=air mass flow in the EGR,
$\dot{m}_{ex}$=exhaust mass flow from the combustion chambers,
$P_{em}$=estimated pressure in the exhaust manifold,
$R_{em}$=gas constant in exhaust manifold,
$c_{v_{em}}$=constant volume specific heat in exhaust manifold,
$V_{em}$=exhaust manifold volume,
$\dot{m}_{egr}$=estimated temperature at exhaust port,
$T_{em}$=estimated temperature in exhaust manifold,
$c_{p_{ex}}$=constant pressure specific heat at exhaust port,
$c_{p_{em}}$=constant pressure specific heat in exhaust manifold,
$\dot{Q}_{em}$=exhaust manifold heat loss rate,
$h_{tem}$=heat transfer coefficient for the exhaust manifold,
$A_{em}$=heat transfer area for the exhaust manifold,
$T_{amb}$=ambient temperature, and
$T_{ex}$=Temperature at exhaust port.

Equation (10) describes air mass conservation in exhaust manifold, equation (11) describes the energy conservation in the exhaust manifold, equation (12) describes exhaust manifold heat loss rate, and equation (13) describes ideal gas low.

The ambient temperature $T_{amb}$ is preferably provided by conventional temperature sensing apparatus adapted to provide a measure of outside air temperature, and connected with the ECM. In the present embodiment, the quantity $\dot{m}_{egr}$, which represents the air mass flow in the EGR from the exhaust manifold, is provided by the EGR apparatus model 800. The quantity $\dot{m}_t$ which represents the turbocharger turbine mass flow, is provided by the turbocharger apparatus model 500. Temperature at exhaust port $T_{ex}$ is preferably provided in stored data sets or map within the engine controller, which correlates the temperature at exhaust port with a plurality of engine operating parameters.

The exhaust manifold is more particularly described in accordance with the exhausted air mass fractions as described in the following modeling equation:

$$f_{air_{em}} = \frac{m_o \cdot f_{air_{im}} - (A/F)_{st} \cdot m_f}{m_o + m_f} \tag{13}$$

where:
$f_{air_{em}}$=air fraction estimation in exhaust manifold,
$m_o$=mass through inlet valves into the combustion chamber,
$f_{air_{im}}$=air fraction estimation in intake manifold,
$(A/F)_{st}$=air to fuel stoichiometric ratio, and
$m_f$=injected fuel mass into the combustion chamber.

Figure 3D:
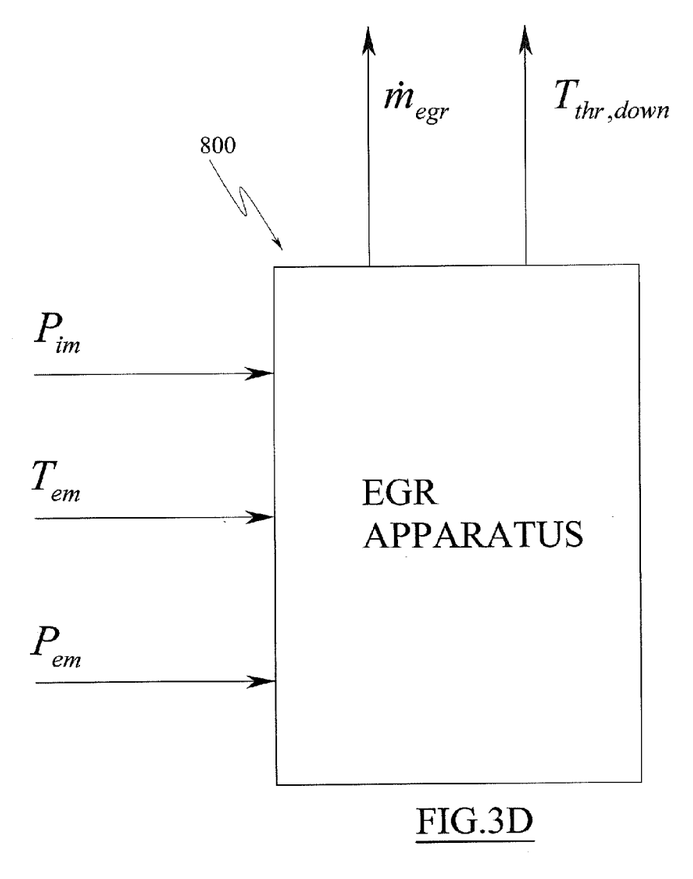

Air to fuel stoichiometric ratio is provided by the ECM. The injected fuel mass is provided by the ECM in accordance with the engine control routines. The EGR apparatus model 800 is illustrated in FIG. 3D. The EGR valve 81 is a controllably restrictive apparatus for affecting mass flow and the cooler 80 is a heat transfer apparatus for removing heat from the mass flow. EGR apparatus model 800 utilizes pressures associated with the intake and exhaust manifolds, thermal input associated with the exhaust manifold gases in describing the temperature associated with the EGR into the intake manifold and the EGR mass flows into the intake manifold. The following modeling equations describe the EGR and cooler $$\dot{m}_{egr} = C_d \cdot A_{egr}(x_{egr}) \cdot \frac{P_{em}}{\sqrt{R_{egr,up}T_{egr,up}}} \cdot \phi\left(\frac{P_{im}}{P_{em}}, \gamma_{egr,up}\right) \tag{14}$$

$$T_{egr,down} = F_{egr}\left(T_{egr,up}, \frac{P_{im}}{P_{em}}\right) \tag{15}$$

where:
$\dot{m}_{egr}$=mass flow through the EGR valve
$C_d$=a EGR valve discharge coefficient,
$A_{egr}$=EGR valve geometric opening area,
$x_{egr}$=EGR valve position,
$P_{em}$=estimated pressure in exhaust manifold,
$P_{em}$=estimated pressure in the exhaust manifold,
$R_{egr,up}$=gas constant upstream EGR valve,
$T_{egr,up}$=temperature upstream EGR valve or at the cooler outlet,
$\phi$=pressure ratio effect in compressible flow equation,
$\gamma_{egr,up}$=ratio of specific heats for EGR flow upstream,
$T_{egr,down}$=temperature downstream EGR valve, and
$F_{egr}$=is a function that models the EGR downstream temperature, The function $F_{egr}$ is implemented in ECM, while $T_{egr,up}$ is determined by the ECM as a function of the engine coolant temperature, the EGR coolant efficiency and the estimated temperature in the exhaust manifold $T_{em}$. EGR valve position $x_{egr}$ is measured by a sensor which is associated to the ECM.

Figure 3E:
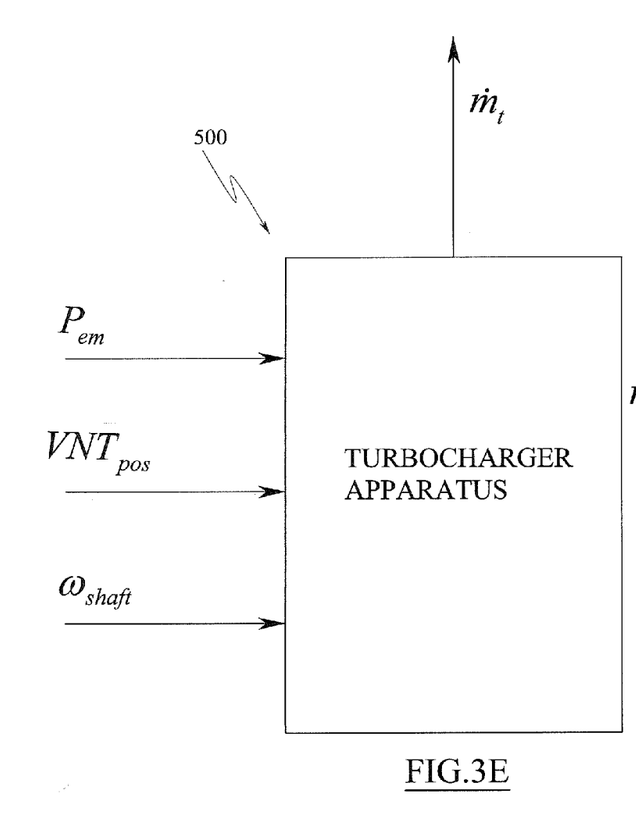

The turbocharger apparatus model 500 is illustrated in FIG. 3E. The turbocharger is a pumping apparatus for effecting mass flow by way of exhaust gas forces operating upon a turbine/compressor combination and the intercooler is considered to be a heat transfer apparatus for removing heat from the mass flow. Turbocharger 29 is adapted to provide a variable boost pressure for a given exhaust flow in accordance with well known variable vane geometry or variable nozzle geometry, commonly referred to as variable geometry turbocharger (VGT) and variable nozzle turbocharger (VNT), respectively. Further reference to turbocharger is consistent with VNT and the particular embodiment of the invention utilizing a variable nozzle turbocharger. Other boost technologies may be used in practicing the present invention. The following modeling equations describe the turbocharger apparatus:

$$\dot{m}_t = F_{turbflow}\left(\omega_{shaft}, \frac{P_{em}}{P_{amb}}, VNT_{pos}\right) \tag{16}$$

where:
$\dot{m}_t$=turbocharger turbine mass flow,
$F_{turboflow}$=is a three dimensional map modeling turbine mass flow, $\omega_{shaft}$=turbocharger shaft speed,
$P_{em}$=estimated exhaust manifold pressure,
$P_{amb}$=ambient pressure, and
$VNT_{pos}$=is the VNT valve position.

The ambient pressure $P_{amb}$ is provided by a barometric pressure sensor (BARO) connected to the ECM. The three dimensional map modeling turbine mass flow $F_{turbflow}$ is preferably provided in stored data sets within the engine controller and is constructed using empirically determined data from a flow test bench of the turbocharger. Turbocharger shaft speed $\omega_{shaft}$ and VNT valve position $VNT_{pos}$ are measured by corresponding sensors which are associated to the ECM.

Figure 3F:
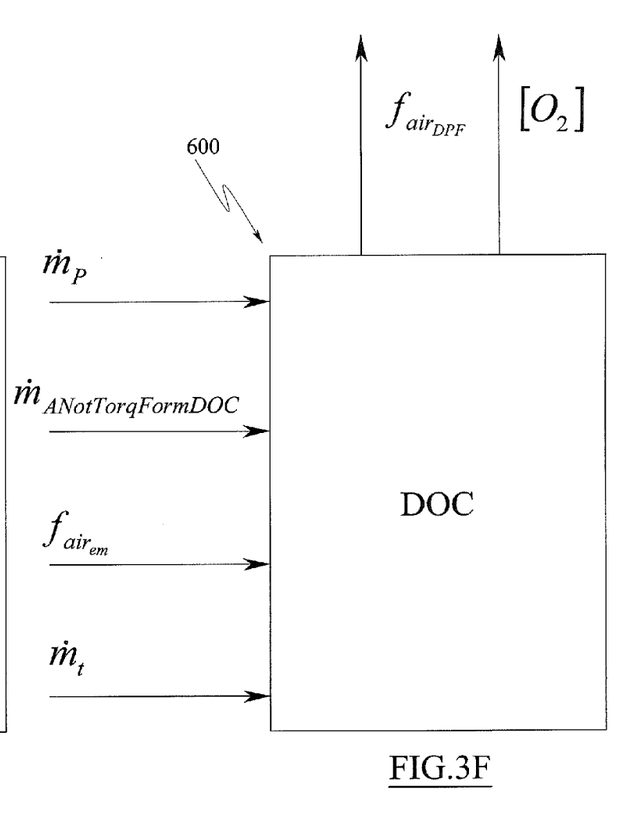

The diesel oxidation catalyst model 600 is illustrated in FIG. 3F. Diesel oxidation catalyst model 600 is characterized by significant mass flows into and out of the catalyst. The significant model inputs are identified as the air fraction estimation in the exhaust manifold $f_{air_{em}}$, and the unburned fuel mass flow coming from the combustion chambers, including post-injected fuel mass flow $\dot{m}_P$ and the part of after-injected fuel mass flow $\dot{m}_{ANotTorqFormDOC}$ which does not burn in combustion chambers. The model utilizes also the remainder exhausted to atmosphere which, in the present example, is the mass flow through the turbine of the turbocharger $\dot{m}_t$. The following algebraic modeling equations describe the diesel oxidation catalyst model 600:

$$f_{air_{DPF}} = f_{air_{em}} - \frac{\dot{m}_{oxi}}{\dot{m}_t} \quad (17)$$

$$\dot{m}_{oxi} = (\dot{m}_P + \dot{m}_{ANotTorqFormDOC}) \cdot \eta_{DOC} \cdot (A/F)_{st} \quad (18)$$

where:
$f_{air_{DPF}}$=air fraction estimation downstream the DOC and upstream DPF,
$f_{air_{em}}$=air fraction estimation in the exhaust manifold,
$\dot{m}_{oxi}$=estimation of hydrocarbons mass flow converted by the oxidation process in the Diesel Oxidation Catalyst,
$\dot{m}_t$=mass flow through the turbine of the turbocharger,
$\dot{m}_P$=post-injected fuel mass flow into the combustion chambers,
$\dot{m}_{ANotTorqFormDOC}$=after-injected fuel mass flow part which does not burn into the combustion chambers and oxidize in the DOC,
$(A/F)_{st}$=air to fuel stoichiometric ratio, and
$\eta_{DOC}$=DOC efficiency.

The air fraction in the exhaust manifold $f_{air_{em}}$ can be estimated using equation (13):

$$f_{air_{em}} = \frac{m_o \cdot f_{air_{im}} - (A/F)_{st} \cdot m_f}{m_o + m_f}$$

This describes the exhausted air mass fractions in the exhaust manifold.

Mass flow through the turbine of the turbocharger $\dot{m}_t$ can be determined using the three dimensional Map $F_{turbflow}$ modeling turbine mass flow according to equation (16):

$$\dot{m}_t = F_{turbflow}\left(\omega_{shaft}, \frac{P_{em}}{P_{amb}}, VNT_{pos}\right).$$

Alternatively, the turbocharger turbine mass flow $\dot{m}_t$ can be estimated using equation, which describes the air mass conservation in exhaust manifold:

$$\frac{dm_{em}}{dt} = \dot{m}_{ex} - \dot{m}_{egr} - \dot{m}_t$$

The foregoing provides that the mass in the exhaust manifold $m_{em}$ can be estimated or measured in another way.

Air to fuel stoichiometric ratio $(A/F)_{st}$ is provided by the ECM. The DOC efficiency $\eta_{DOC}$ is determined by the ECM using an empirically determined data set or map which correlates DOC efficiency to a plurality of engine operating parameters.

The post-injected fuel mass flow $\dot{m}_P$ is determined by the ECM using an empirically determined data set or map within the engine controller, and which correlates post-injected fuel mass flow to a plurality of engine operating parameters.

The part of after-injected fuel mass flow which does not burn into the combustion chamber $\dot{m}_{ANotTorqFormDOC}$ is determined by the ECM in accordance with the engine control routines.

As a matter of fact, ECM is generally provided with an empirically determined data set which correlates percentage of after-injected fuel mass flow which does not burn into the combustion chamber, to a plurality of engine operating parameters.

The oxygen concentration downstream the DOC and upstream the DPF can be simply determined as a function of the air mass fraction in that point according to the following equation:

$$[O_2]_{DPF} = \frac{(M_{N_2}/M_{O_2}) \cdot (0.233 \cdot f_{air_{DPF}})}{1 + (M_{N_2}/M_{O_2} - 1) \cdot (0.233 \cdot f_{air_{DPF}})} \quad (19)$$

where:
$[O_2]$=oxygen volume concentration,
$M_{N2}$=nitrogen molecular weight, and
$M_{O2}$=oxygen molecular weight Experimental tests have proved that the estimation method according to equations (17) and (19) allows easy and accurate oxygen estimation downstream the DOC, even during the DPF regeneration process, since both post-injected fuel and "unburned" part of after-injected fuel are taken into account.

Oxygen concentration downstream the DOC is an important parameter in controlling the temperature gradients in the DPF, especially during the regeneration process. As a matter of fact, such amount of oxygen affects the amount of particles (soot) which burns into the DPF.

Controlling the amount of oxygen downstream the DOC is therefore useful for avoiding high temperature gradients inside the DPF during soot combustion, especially at the beginning of the regeneration process, when the temperature inside the DPF into rapidly because of the heat produced by the combustion of the particles.

For this reason, the invention provides a control system for a diesel combustion engine which comprises a computer instruction code, stored in a non-volatile memory of the ECM, for implementing the method for estimating the oxygen concentrations downstream the DOC according to the equations (17) and (19), and at least one actuator which is controlled by the ECM in response to said estimated oxygen concentration downstream the Diesel Oxidation Catalyst.

More particularly, the ECM applies the engine operating parameter, and all the other quantities involved, to the computer code for estimating oxygen concentration downstream the DOC, especially during the DPF regeneration process, and then control such an actuator in response of the oxygen estimation. Preferably, the actuator is suitable for regulating an engine operating parameter which affects oxygen concentration downstream the Diesel Oxidation Catalyst, in order to enable the control system to control the combustion of particles of soot in the DPF, during regeneration process.

For example, the actuator can be a throttle valve actuator adapted to regulate the intake air mass flow, or an EGR valve actuator adapted to regulate the mass flow through EGR valve. Alternatively, such an actuator can be adapted for regulating the post-injection start of injection or post-injected fuel quantity, or can be adapted for regulating the after-injection start of injection or after-injected fuel quantity.

The control system according to an embodiment of the invention has proven to be useful for avoiding high temperature gradients inside the DPF during soot combustion.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient toad map for implementing an exemplary embodiment, it being understood that various changes may be made in the function and arrangement of elements described in an exemplary embodiment without departing from the scope as set forth in the appended claims and their legal equivalents.

What is claimed is:

1. A method for estimating oxygen concentration downstream a diesel oxidation catalyst within a diesel engine system comprising at least an intake manifold, a combustion chamber, an exhaust manifold, an exhaust line for channeling the exhaust gases from exhaust manifold to atmosphere, and the diesel oxidation catalyst located in the exhaust line upstream a diesel particulate filter, the method comprising:
   determining an unburned fuel mass flow ($\dot{m}_P$, $\dot{m}_{ANotTorqFormDOC}$) ejected from the combustion chamber,
   determining an air mass fraction ($f_{air_{em}}$) in the exhaust manifold;
   estimating an air mass fraction ($f_{airDPF}$) downstream the diesel oxidation catalyst as a function of said unburned fuel mass flow ($\dot{m}_P$, $\dot{m}_{ANotTorqFormDOC}$) and said air mass fraction ($f_{air_{em}}$) in the exhaust manifold; and
   estimating oxygen concentration downstream the diesel oxidation catalyst as a function of the estimated air mass fraction ($f_{air_{DPF}}$) downstream the diesel oxidation catalyst.

2. The method according to claim 1, wherein determining said unburned fuel mass flow comprises determining flow of post-injected fuel mass ($\dot{m}_P$), which is injected into the combustion chamber during diesel particulate filter regeneration.

3. The method according to claim 2, wherein said post-injected fuel mass flow ($\dot{m}_P$) is determined from an empirically determined data set correlating post-injected fuel mass flow ($\dot{m}_P$) to a plurality of engine operating parameters.

4. The method according to claim 1, wherein determining said unburned fuel mass flow in the exhaust manifold comprises determining the part of after-injected fuel mass flow ($\dot{m}_{ANotTorqFormDOC}$), which is injected into the combustion chamber during diesel particulate filter regeneration, but which does not burns in the combustion chamber.

5. The method according to claim 4, wherein an unburned part of after-injected fuel mass flow ($\dot{m}_{ANotTorqFormDOC}$) is determined from an empirically determined data set correlating unburned part of after-injected fuel mass flow ($\dot{m}_{ANotTorqFormDOC}$) to a plurality of engine operating parameters.

6. The method according to claim 1, wherein estimating air mass fraction ($f_{air_{DPF}}$) downstream the diesel oxidation catalyst comprises estimating hydrocarbons mass flow ($\dot{m}_{oxi}$) converted in the diesel oxidation catalyst by oxidation process of said unburned fuel mass flow ($\dot{m}_P$, $\dot{m}_{ANotTorqFormDOC}$) therein.

7. The method according to claim 6, wherein estimating said hydrocarbons mass flow ($\dot{m}_{oxi}$) converted in the diesel oxidation catalyst comprises:
   determining diesel oxidation catalyst efficiency ($\eta_{DOC}$);
   determining air to fuel stoichiometric ratio; and
   estimating said hydrocarbons mass flow ($\dot{m}_{oxi}$) converted in the diesel oxidation catalyst as a function of said unburned fuel mass flow ($\dot{m}_P$, $\dot{m}_{ANotTorqFormDOC}$), diesel oxidation catalyst efficiency ($\eta_{DOC}$), and air to fuel stoichiometric ratio.

8. The method according to claim 7, wherein said diesel oxidation catalyst efficiency ($\eta_{DOC}$) and air to fuel stoichiometric ratio are determined from corresponding empirically determined data sets, which respectively correlate diesel oxidation catalyst efficiency ($\eta_{DOC}$) and air to fuel stoichiometric ratio to a plurality of engine operating parameters.

9. The method according to claim 1, wherein determining the air mass fraction ($f_{air_{em}}$) in the exhaust manifold comprises:
   determining mass ($m_o$) through the inlet valves into the combustion chamber,
   determining air fraction ($f_{air_{im}}$) in the intake manifold;
   determining injected fuel mass ($m_f$) into the combustion chamber,
   determining air to fuel stoichiometric ratio; and
   estimating air mass fraction ($f_{air_{em}}$) in the exhaust manifold as a function of said determined mass ($m_o$) through the inlet valves into the combustion chamber, air fraction ($f_{air_{im}}$) in the intake manifold, injected fuel mass ($m_f$) into the combustion chamber, and air to fuel stoichiometric ratio.

10. A control system for a diesel engine system comprising at least an intake manifold, a combustion chamber, an exhaust manifold, an exhaust line for channeling the exhaust gases from exhaust manifold to atmosphere, and a diesel oxidation catalyst located in the exhaust line upstream a diesel particulate filter, the control system comprising:
   a mechanism adapted to provide a respective measure of a plurality of engine operating parameters;
   a microprocessor based controller adapted to receive the engine operating parameter measures as inputs, the microprocessor based controller adapted to:
   determine unburned fuel mass flow ($\dot{m}_P$, $\dot{m}_{ANotTorqFormDOC}$) ejected from the combustion chamber,
   determine air mass fraction ($f_{air_{em}}$) in the exhaust manifold;
   estimate air mass fraction ($f_{air_{DPF}}$) downstream the diesel oxidation catalyst as a function of said unburned fuel mass flow ($\dot{m}_P$, $\dot{m}_{ANotTorqFormDOC}$) and said air mass fraction ($f_{air_{em}}$) in the exhaust manifold; and
   estimate oxygen concentration downstream the diesel oxidation catalyst as a function of the estimated air mass fraction ($f_{air_{DPF}}$) downstream the diesel oxidation catalyst;
   an actuator controlled in response to said estimated oxygen concentration downstream the diesel oxidation catalyst.

11. The control system according to claim 10, wherein said actuator is adapted to regulate an engine operating parameter which affects oxygen concentration downstream the diesel oxidation catalyst.

12. The control system according to claim 10, wherein said at least one actuator comprises a throttle valve actuator.

13. The control system according to claim 10, wherein said internal combustion engine further comprises an exhaust gas recirculation apparatus for variable recirculation of exhaust gases from the exhaust manifold to the intake manifold, and wherein said at least one actuator comprises an exhaust gases recirculation valve actuator.

14. The control system according to claim 10, wherein said at least one actuator is adapted for regulating post-injection start of injection or post-injected fuel quantity.

15. The control system according to claim 10, wherein said at least one actuator is adapted for regulating after-injection start of injection or after-injected fuel quantity.

* * * * *